United States Patent
Rebello et al.

(10) Patent No.: US 6,856,842 B2
(45) Date of Patent: Feb. 15, 2005

(54) METHOD AND SYSTEM FOR CREATING A TOOLING MASTER MODEL FOR MANUFACTURING PARTS

(75) Inventors: Alexander Bernard Flavian Rebello, Scotia, NY (US); Michael Charles Ostrowski, Glenville, NY (US); Kena Kimi Yokoyama, Latham, NY (US); Vinod Padmanabhan Kumar, Guilderland, NY (US); Dean Michael Robinson, Schenectady, NY (US)

(73) Assignee: General Electric Company, Niskayuna, NY (US)

(*) Notice: Subject to any disclaimer, the term of this patent is extended or adjusted under 35 U.S.C. 154(b) by 357 days.

(21) Appl. No.: 09/683,699

(22) Filed: Feb. 5, 2002

(65) Prior Publication Data

US 2003/0149502 A1 Aug. 7, 2003

(51) Int. Cl.[7] .............................................. G06F 19/00
(52) U.S. Cl. ................................ 700/31; 700/98; 703/2
(58) Field of Search ........................ 700/28–31, 95–98, 700/103–106; 703/1, 2

(56) References Cited

U.S. PATENT DOCUMENTS

| | | | |
|---|---|---|---|
| 4,995,087 A | 2/1991 | Rathi et al. ................. | 382/152 |
| 5,033,005 A | 7/1991 | Haske ......................... | 700/187 |
| 5,177,689 A | 1/1993 | Kinasi et al. ............... | 700/184 |
| 5,191,534 A | 3/1993 | Orr et al. .................... | 700/105 |
| 5,309,366 A | 5/1994 | Grenkowitz ................ | 700/182 |
| 5,432,703 A | 7/1995 | Clynch et al. .............. | 700/168 |
| 5,434,803 A | 7/1995 | Yoshida ...................... | 702/168 |
| 5,479,593 A | 12/1995 | Brewer et al. .............. | 345/441 |
| 5,485,390 A | 1/1996 | LeClair et al. .............. | 700/182 |
| 5,487,012 A | 1/1996 | Topholm et al. ........... | 700/163 |
| 5,539,649 A | 7/1996 | Walsh et al. ................ | 700/163 |
| 5,542,030 A | 7/1996 | Gutfinger .................... | 345/423 |
| 5,543,103 A | 8/1996 | Hogan et al. ............... | 264/219 |
| 5,552,992 A | 9/1996 | Hunter ........................ | 700/118 |
| 5,552,995 A | 9/1996 | Sebastian .................... | 700/97 |
| 5,594,651 A | 1/1997 | St. Ville ..................... | 700/98 |
| 5,687,094 A | 11/1997 | Kagawa et al. ............. | 716/5 |
| 5,742,288 A | 4/1998 | Nishizaka et al. .......... | 345/418 |
| 5,799,293 A | 8/1998 | Kaepp ......................... | 706/45 |
| 5,822,206 A | 10/1998 | Sebastian et al. ........... | 700/97 |
| 5,926,388 A | 7/1999 | Kimbrough et al. ........ | 700/118 |
| 5,933,353 A | 8/1999 | Abriam et al. .............. | 700/182 |
| 5,966,310 A | 10/1999 | Maeda et al. ............... | 707/104.1 |
| RE36,602 E | 3/2000 | Sebastian et al. ........... | 700/97 |
| 6,036,345 A | 3/2000 | Jannette et al. ............. | 700/97 |
| 6,065,857 A | 5/2000 | Hazama et al. ............. | 700/95 |
| 6,148,277 A | 11/2000 | Asava et al. ................ | 703/22 |
| 6,430,455 B1 * | 8/2002 | Rebello et al. ............. | 700/105 |
| 6,434,441 B1 * | 8/2002 | Beauchamp et al. ....... | 700/98 |
| 6,556,959 B1 * | 4/2003 | Miller et al. ................ | 703/2 |
| 6,587,741 B1 * | 7/2003 | Chetta et al. ............... | 700/97 |
| 6,643,615 B1 * | 11/2003 | Bauer et al. ................ | 703/6 |

FOREIGN PATENT DOCUMENTS

| | | |
|---|---|---|
| EP | 1050786 | 8/2000 |
| EP | 0992869 | 12/2000 |
| GB | 2350809 | 12/2000 |

OTHER PUBLICATIONS

European Search Report EP 03251594, Oct. 27, 2003.

* cited by examiner

*Primary Examiner*—Maria N. Von Buhr
(74) *Attorney, Agent, or Firm*—Penny A. Clarke; Patrick K. Patnode

(57) ABSTRACT

A method of creating a tooling master model for a manufacturing process for a part includes generating a manufacturing context model from a parametric model for the part. The tooling master model includes a tooling geometry for the part, and the manufacturing context model includes a number of tooling features. A system for generating the tooling master model includes a computer aided design (CAD) system configured to receive the parametric model and to generate the manufacturing context model from the parametric model.

20 Claims, 6 Drawing Sheets

METHOD AND SYSTEM FOR CREATING A TOOLING MASTER MODEL FOR MANUFACTURING PARTS

BACKGROUND OF INVENTION

This invention relates to a method and system for creating a tooling master model for manufacturing parts, such as turbine blades, and to a method for manufacturing parts.

Current tooling design processes reconstruct a part model, for example by extracting surfaces and adding features, to create an initial tooling model. The design of the initial tooling model is "manual," meaning that it is performed by an expert tooling designer. Next, manufacturing compensation is performed. For example, for die casting, die surfaces must compensate for shrinkage. Typically, the initial tooling model is analyzed. However, current analysis processes are not integrated with the initial tooling model. Namely, the tooling geometry for the initial tooling model is manually meshed. If the results are unsatisfactory such that the tooling model is revised by the tooling designer, the tooling model must again be manually meshed to repeat the analysis.

There are a number of drawbacks to the existing tooling design processes. Current tooling design processes for parts with any complexity require a considerable amount of part-family and manufacturing specific engineering knowledge and judgment. Thus, the engineer performing the tooling design must be experienced in designing tooling for the same type of parts. This requirement increases tooling design time, and hence overall manufacturing cycle time, thereby reducing throughput due to the short supply of engineers possessing such part-family and manufacturing specific experience. Moreover, sole reliance on experienced engineers to apply tooling design rules, makes it easy to overlook design rules that could prove critical to the manufacture of the part. Further, the manual reconstruction of tooling geometry must be repeated if any changes are made to the part model. In addition, the tooling model must be manually meshed to perform an engineering analysis each time the tooling model is revised by the tooling designer.

It would therefore be desirable to develop a method and system for generating a tooling model that is integrated with a part design model, such that changes to the part design model are reflected in the tooling model. It would further be desirable for the method and system to automatically apply knowledge acquired through tooling design experience in generating the tooling model, in order to reduce the burdens of designing tooling for complex parts on experienced engineers and to reduce the possibility of human error. In addition, it would be desirable for the method and system to integrate information across a design system and databases, to ensure the consistency of application models used to develop and evaluate tooling geometries.

SUMMARY OF INVENTION

Briefly, in accordance with an embodiment of the present invention, a method of creating a tooling master model for a manufacturing process for a part is disclosed. The tooling master model includes a tooling geometry for the part. The method includes generating a manufacturing context model from a parametric model for the part. The manufacturing context model includes a number of tooling features.

In accordance with another embodiment of the present invention, a system for generating the tooling master model includes a computer aided design (CAD) system configured to receive the parametric model and to generate the manufacturing context model from the parametric model.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
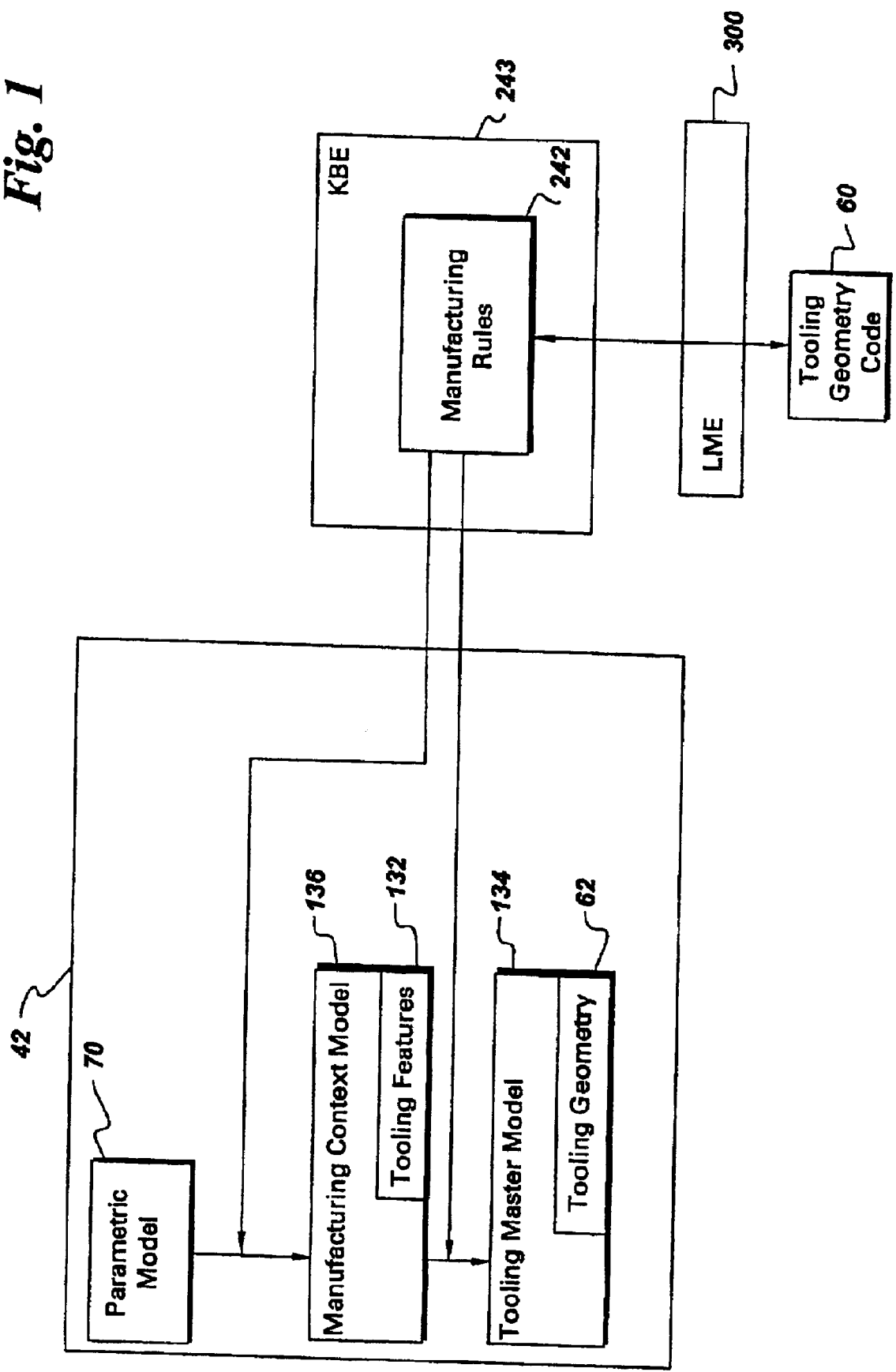
FIG. 1 shows a hybrid system/process block diagram for generation of a tooling master model from a parametric model.

A method of creating a tooling master model 134 for a manufacturing process for a part 10 is described generally with reference to the flow chart shown in FIG. 1. The method includes generating a manufacturing context model 136 from a parametric model 70 for the part 10. Parametric model 70 is a representation of part 10, for example a computer model usable within computer aided design (CAD) software, in which part geometry is described in terms of features, such as holes, lines, curves, chamfers, blends, radii, well defined shapes, user defined shapes, shapes from shape libraries etc. and parameters associated with and between these features. In other words, parametric model 70 is a parametric model of the part design for part 10. At any given time, the parameters take on specific numerical values or relationships between parameters. Desirably, this parametric representation of part 10 is flexible, in that part 10 is described by a set of parameters, for example length, width, and height, all of which can vary. Consequently, parametric model 70 can be altered all at once by changing the value of one or more of the parameters. Moreover, a parametric model applies to an entire part family. Parts belonging to a part family differ only with respect to the values of the parameters describing the parts or with respect to small topological changes, for example different hole sizes or positions corresponding to different machining steps.

Commercially available examples of CAD software include Unigraphics sold by Unigraphics Solutions, ProEngineer sold by Parametric Technologies, CATIA sold by IBM/Dassault Systems, IDEAS sold by SDRC, and Autocad. However, the present invention is by no means limited to any particular CAD software but rather embraces the use of any CAD software.

As used here, the phrase "context model" means a model having an associative relationship with the underlying parametric model (here, parametric model 70), such that when a parameter value is changed in the underlying parametric model, the context model is automatically updated to reflect this change. Thus, manufacturing context model 136 is automatically updated to reflect changes to parametric model 70, i.e. to the part design.

Figure 2:
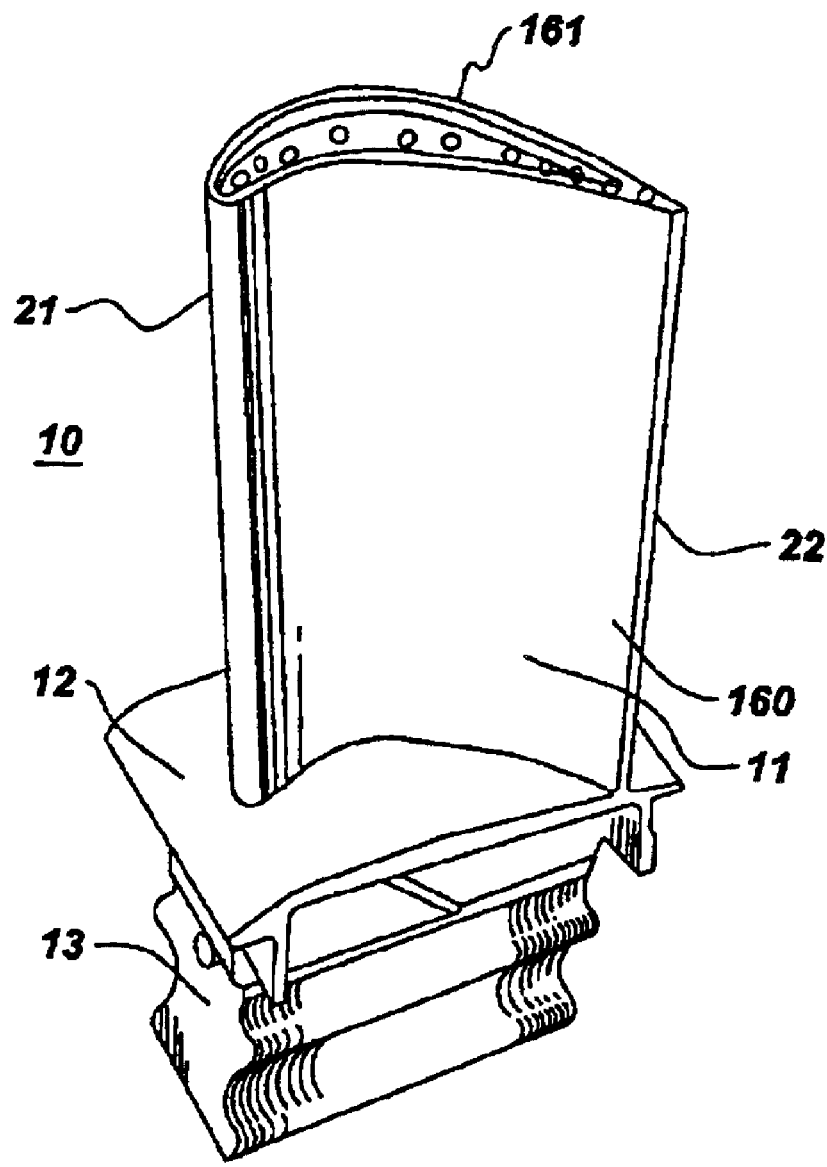
FIG. 2 shows a turbine blade.

Manufacturing involves one or more manufacturing steps. Manufacturing steps include all types of manufacturing processes, for example forming steps, material addition steps (for example, deposition), material removal steps (for example machining, EDM or ECM), rapid prototyping steps (for example stereolithography), and finishing steps (for example, shot peening or laser peening). Exemplary machining steps include tool path generation. The desired end-product of any particular step in the manufacturing process is a "shape" of the part being manufactured. Manufacturing context model 136 prescribes the end result (or "shape") of each of the manufacturing steps. In other words, the goal of each manufacturing step is to create a part that looks like the manufacturing context model 136 for that manufacturing step. As indicated in FIG. 1, manufacturing context model 136 includes a number of tooling features 132. Tooling features 132 provide tooling geometries for part features. One example of part 10 is a turbine blade 10, which is illustrated in FIG. 2. Exemplary tooling features for blade 10 include airfoil tooling geometry (not shown) for forming airfoil 11, a cavity tooling geometry for forming dovetail 12, and a platform tooling geometry for forming platform 13. The tooling features 132, in turn, may include tooling sub-features (also indicated by reference numeral 132 and generally referred to also as "tooling features" 132). For example, the airfoil tooling geometry may include pressure side and suction side tooling sub-features for forming pressure side 160 and suction side 161 of airfoil 11. Thus, manufacturing context model 136 prescribes the shape of the tooling features for each step in the manufacturing process.

As indicated in FIG. 1, tooling master model 134 includes a tooling geometry 62 for part 10. Tooling geometry 62 is obtained from tooling features 132, for example, by applying tooling design rules that impose continuity or other matching conditions for adjoining tooling features. According to a particular embodiment, tooling master model 134 further includes process parameters for each manufacturing step and toolpaths. Toolpaths are included for manufacturing processes that include one or more machining or material addition steps. Examples of toolpaths include paths for cutters, lasers, and drills, as well as for solid free form fabrication (for example, laser cladding) and rapid prototyping (for example stereolithography and LOM). In this manner, tooling master model 134 prescribes the shape of the hard tooling 400, for example dies, to form the desired part shape at each step in the manufacturing process. After addition of tolerances (discussed in greater detail below with respect to FIG. 3), tooling master model 134 is used for generating hard tooling 400 for manufacturing part 10. Further, tooling master model is a parametric model and thus can be used to generate hard tooling 400 for the part family. Hard tooling 400 is the physical tooling used to form the re-engineered parts. Hard tooling may be made of hard materials (for example, metals, such as hardened tool steels), soft materials (for example, epoxies, low melting point alloys, wax, wood, and aluminum), and combinations thereof.

Figure 3:
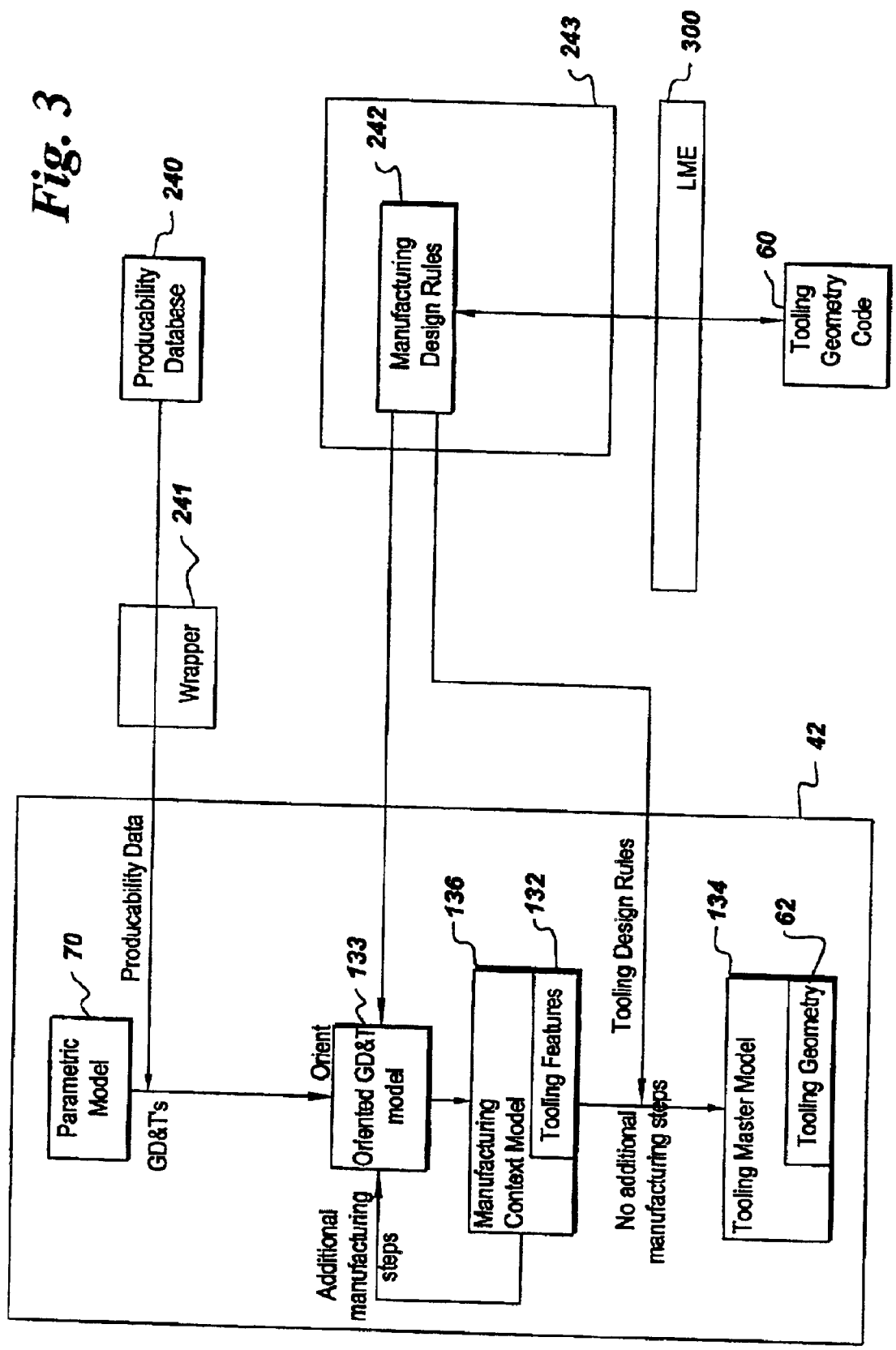
FIG. 3 shows a hybrid system/process block diagram for generation of the tooling master model from the parametric model.

According to a more particular embodiment, parametric model 70 includes a number of geometric dimensions and tolerances (GD&Ts or "geometric tolerances.") GD&Ts specify the maximum allowable deviation from the nominal size and shape specified by the part design underlying parametric model 70. If parametric model 70 does not include GD&Ts, the method according to a more particular embodiment further includes processing parametric model 70 with producibility data from a producibility database 240, to add the GD&Ts, as indicated in FIG. 3. For example, parametric model 70 is linked to producibility database 240 via a Wrapper 241, as indicated in FIG. 3. Wrappers are application interface codes that wrap around an analysis program, and one example is a Federated Intelligent Product Environment (FIPER) wrapper. Exemplary producibility data include process capability limits, for example, for surface flatness for a casting operation.

According to a particular embodiment, for which the manufacturing process includes at least one manufacturing step, manufacturing context model 136 is generated, for example in a CAD Program 42. As shown in FIG. 3, parametric model 70 with geometric dimensions and tolerances is oriented to obtain an oriented GD&T model 133, for example in CAD Program 42. A number of manufacturing design rules 242 are applied to oriented GD&T model 133 to obtain the manufacturing context model 136 for the manufacturing step.

Manufacturing design rules 242 include tooling design rules for forming steps and tool path generation rules for machining steps and represent the experience of tooling designers for part 10 and more generally, for the part family. Exemplary tooling design rules 242 construct a parametric geometry for the tooling and include formulas and other relationships between parameter values. More complex tooling design rules 242 involve execution of tooling geometry code 60. As shown in FIG. 3, execution of tooling geometry code 60 is performed via a linked model environment (LME) 300. Beneficially, the manufacturing design rules 242 capture the tooling design know-how of experienced engineers, thereby reducing the demands of the tooling design process on such engineers.

More particularly, manufacturing design rules 242 are implemented in a knowledge based environment 243, for example using EDS's Knowledge Fusion, which is a knowledge based engineering module for the Unigraphics environment, or using Intent Knowledge Station, which is supplied by Heidi Corp. Although knowledge based environment 243 is shown in FIGS. 1 and 3 as being separate from CAD Program 42, knowledge based environments can be either internal or external to CAD Programs and the invention covers knowledge based environments 243 internal or external to CAD Program 42. For example, Knowledge Station is an external knowledge based environment, whereas Knowledge Fusion is an internal knowledge based engineering module for the Unigraphics CAD program. In this manner, knowledge based environment 243 controls creation of the parametric geometry in CAD Program 42 for the tooling features by calling functions in CAD program 42. Beneficially, application of manufacturing design rules 242 by knowledge based environment 243 results in a rigorous and methodical application of engineering knowledge to the tooling design, avoiding inadvertent omissions of critical design rules by engineers.

In the event that only one manufacturing step will be used, such as for a simple part (e.g., injection molded plastic screws), manufacturing context model 136 is generated in this manner. However, for more complex parts, such as blade 10, several manufacturing steps may be performed, for example to form airfoil 11, platform 12, and dovetail 13 and to machine holes, for example radial cooling holes (not shown) in airfoil 11. For illustrative purposes only, FIG. 6 shows the generation of a manufacturing context model 136 for a hypothetical part 10, the manufacture of which involves two forming steps and two machining steps.

Figure 6:
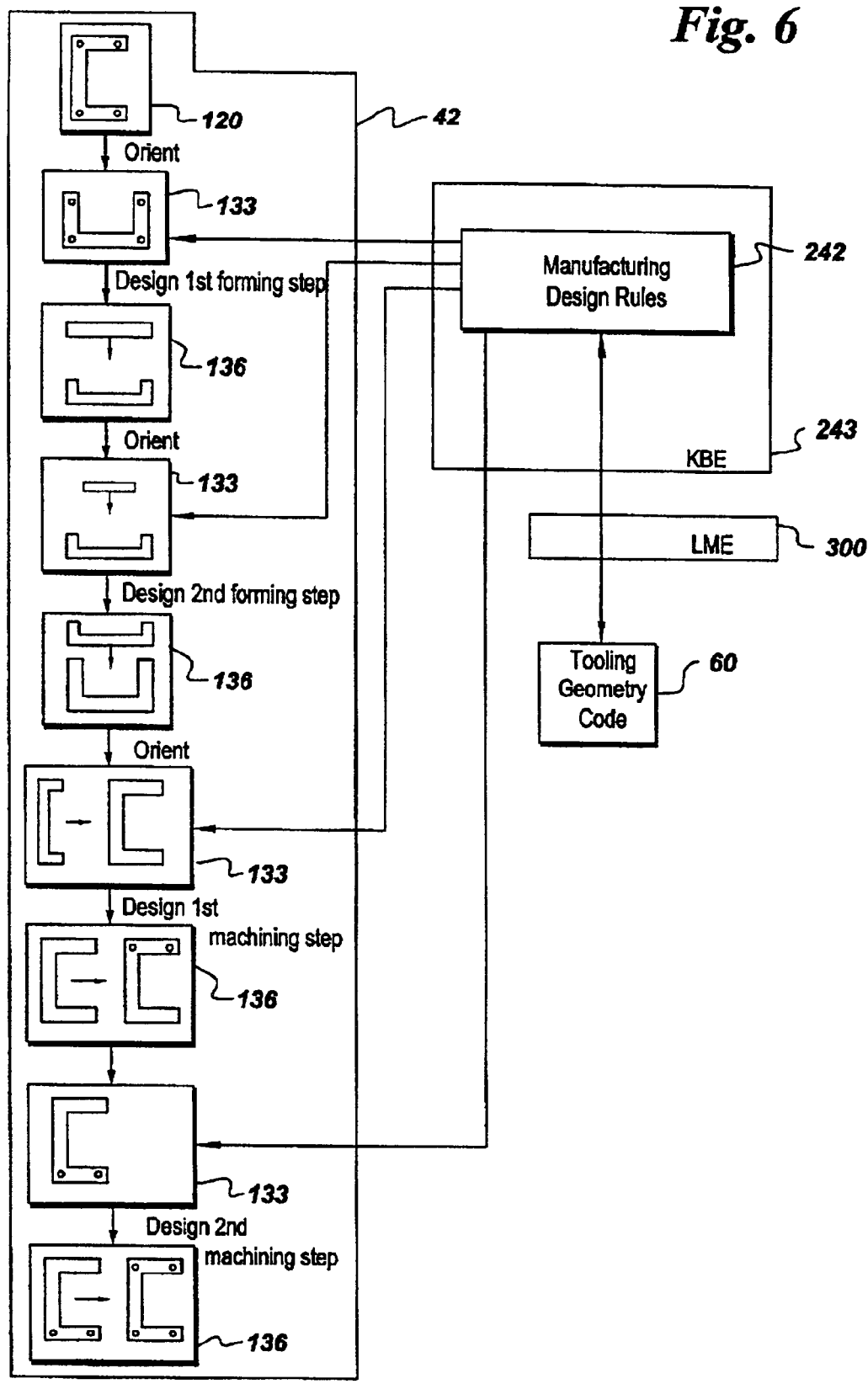
FIG. 6 shows the generation of a manufacturing context model for a hypothetical part, the manufacture of which involves four manufacturing steps.

According to a particular embodiment, the manufacturing process includes at least one additional manufacturing step, and generation of manufacturing context model 136 further includes orienting manufacturing context model to obtain oriented GD&T model 133, as indicated for example in FIG. 6. As used here, the term "orient" refers to spatial orientation. Manufacturing design rules 242 are applied to oriented GD&T model 133 to generate manufacturing context model 136 encompassing the additional manufacturing step, as exemplarily shown in FIG. 6. This process is repeated for each of the additional manufacturing steps. According to one embodiment, the additional manufacturing steps include at least one forming step, for example a forging step. For another embodiment, the additional manufacturing steps include at least one machining step, for example lasing a number of holes in part 10. For the latter embodiment, tooling master model 134 further includes toolpaths and process parameters for performing the machining steps, the toolpaths being derived from manufacturing context model 136.

Accordingly, manufacturing context model 136 prescribes the shape of the part being manufactured and specifies the tooling features 132 for each of the manufacturing steps performed during the manufacturing process. Beneficially, by using the manufacturing context model for the previous manufacturing step as the starting point for the generation of the manufacturing context model encompassing the subsequent step, the generation of the manufacturing context model for each of the manufacturing steps incorporates any changes made for previous manufacturing steps, as well as to parametric model 70.

Although manufacturing context model 136 includes tooling features 132, which provide tooling geometries for part features, to create the tooling (for example, dies) a tooling geometry 62 is required. Tooling geometry 62 is a model of the tooling for the one or more manufacturing steps. For the case of a two forming step manufacturing process, for example, tooling geometry 62 includes models for a first and a second tooling, with each model derived from tooling features 132 for the respective forming step. More particularly, tooling master model 134, which includes tooling geometry 62, is generated by applying tooling design rules 242 to manufacturing context model 136, to derive tooling geometry 62 from tooling features 132. For the exemplary embodiment shown in FIG. 3, tooling master model 134 is generated in CAD Program 42 by applying tooling design rules 242 using knowledge based environment 243. Exemplary tooling design rules 242 impose continuity or other matching conditions for adjoining tooling features 132 to form tooling geometry 62 for part 10.

In addition to tooling geometry 62, tooling master model 134 according to a particular embodiment further includes process parameters for each manufacturing step and toolpaths. More particularly, process parameters are included as attributes in tooling master model 134 for one embodiment and are stored in a linked attribute file in tooling PDM system 320 for another embodiment. As explained above, toolpaths are included for manufacturing processes that include one or more machining steps. For example, if the manufacturing step is a forging, an exemplary tooling geometry 62 includes a die geometry (derived from manufacturing context model 136) and an exemplary tooling master model 134 further includes process parameters, such as press speed, temperature, and load. If the manufacturing step is a machining operation, tooling master model 134 includes toolpaths (geometry) and process parameters, such as cutter speed, type of cutter, and feedrate.

Figure 4:
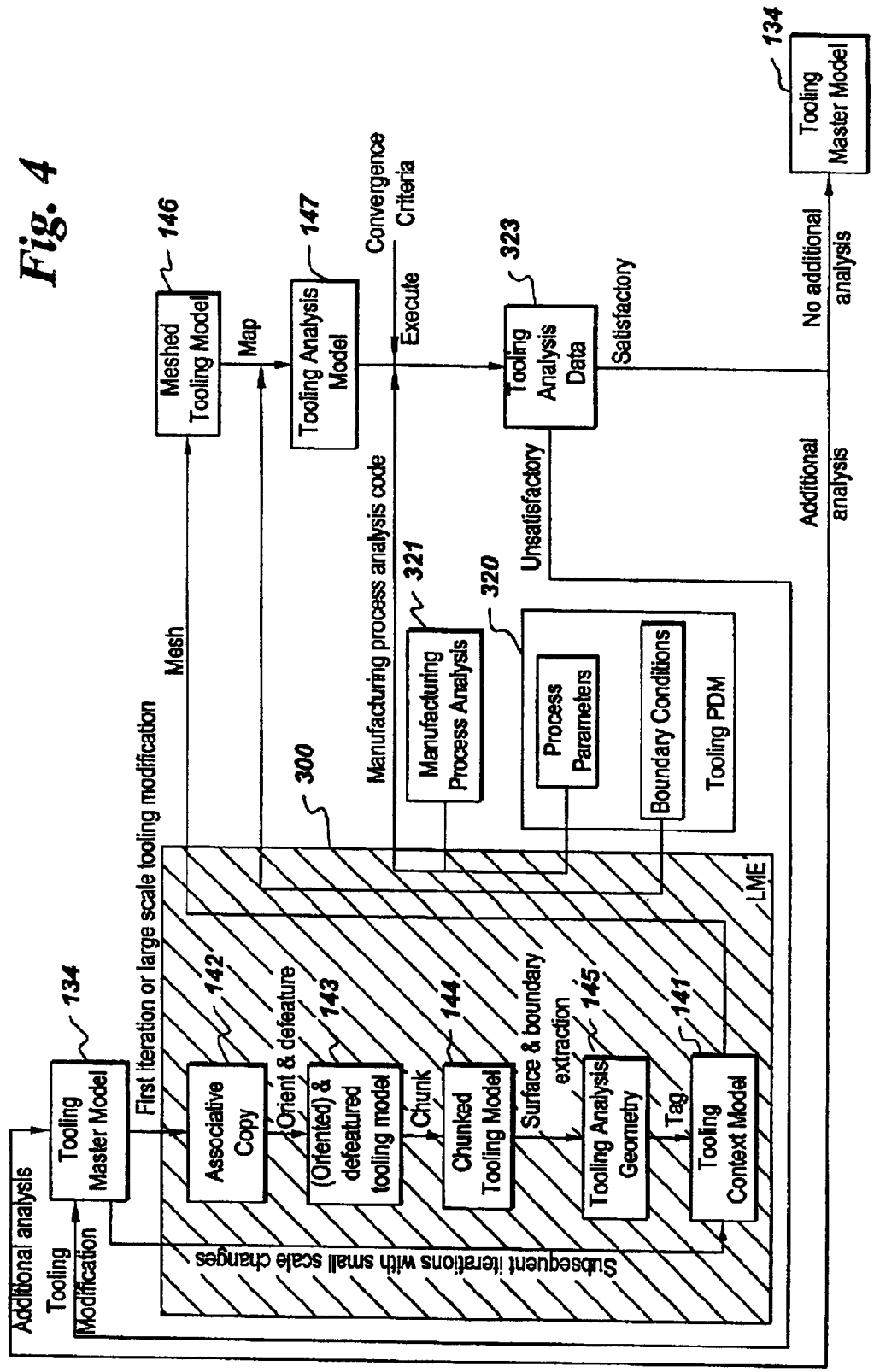
FIG. 4 shows a hybrid system/process block diagram for generation of a tooling context model from the tooling master model, for preparing the tooling context model for execution of a manufacturing process analysis, and for executing the manufacturing process analysis to evaluate the tooling master model.

In order to evaluate tooling master model 134, it is useful to perform one or more manufacturing process analyses, such as a forging process simulation for a forged part, such as an engine disk or a compressor blade. The manufacturing process analysis is used to evaluate tooling geometry 62 to verify that the manufacturing step yields the expected output. According to a particular embodiment, the method further includes creating at least one tooling context model 141, as illustrated in FIG. 4. The tooling context model 141 includes an associative copy 142 of tooling master model 134. The associative copy 142 is configured for performing a manufacturing process analysis 321. The term "associative" means that there exists a master-slave relationship between tooling master model 134 and its associative copy 142, such that changes to tooling master model 134 are reflected in associative copy 142 (i.e., associative copy 142 is synchronized to tooling master model 134). More particularly, tooling master model 134 is abstracted to a level of detail necessary to perform the manufacturing process analysis (e.g., the necessary detail may comprise only one specific portion of tooling geometry 62. According to a more particular embodiment, tooling context model 141 is linked to tooling master model 134 via an assembly file.

An exemplary creation of tooling context model 141 is illustrated in FIG. 4, for which tooling context model 141 is created in linked model environment (LME) 300. Advantageously because tooling context model 141 is created in LME 300, it is automatically updated when changes to tooling master model 134 are made, obviating the manual revisions required by current tooling design analysis processes. By way of background, a linked model environment is a methodology that encompasses using commercial or proprietary code in a manner that is seamless to the end user. More particularly, a typical LME links a geometry stored in a CAD Program to an external analysis code. In this manner, LME 300 ensures the consistency of application models used to evaluate tooling geometry 62. One example of a typical LME is a C program that takes a Unigraphics context model for finite element analysis, runs the context model through ICEM to create a meshed ANSYS input file, and then runs ANSYS to generate the results. Exemplary LME's include an interface, a script, a program, and a collection of programs.

In order to perform the manufacturing process analysis, context model 141 must be compatible with a manufacturing process analysis program 321. Typical manufacturing process analysis programs, for example, provide algorithms for the solution of mechanical stress, heat transfer, modal analysis, buckling, and computational fluid dynamics problems, and examples include, but are not limited to, ANSYS, ABAQUS and Star-CD™. To render context model 141 compatible with manufacturing process analysis 321, context model 141 is created as shown in FIG. 4, according to a more particular embodiment. As indicated in FIG. 4, associative copy 142 is oriented and defeatured using a set of analysis code guidelines to obtain a defeatured tooling model 143. For example, manufacturing process analysis 321 may require rotation of associative copy 142 by ninety degrees. Defeaturing is performed to obtain the subset of associative copy 142 necessary to run manufacturing process analysis 321, while removing portions of associative copy 142 that are not needed for executing manufacturing process analysis 321.

To simplify meshing for manufacturing process analysis 321, defeatured tooling model 143 is chunked using the analysis code guidelines to obtain a chunked tooling model 144. "Meshing," as used herein, means subdividing a parametric shape into pieces small enough to allow the field quantities of interest to be approximated by using polynomials, for example. As used here, the term meshing includes both "meshing" used in finite element analysis (FEA) programs and "gridding" used in computational fluid dynamics (CFD) programs. Another term used for meshing in the art is "discretization." "Chunking," as used herein, means subdividing defeatured tooling model 143 into a collection of simple shapes (for example six-sided volumes) where the boolean sum of the simple shapes make up the original shape and where each shape contains the full information of the parent geometry. It will be appreciated by one of ordinary skill in the art that the spatial relationship between the geometries of tooling master model 134 and the simple shapes of chunked tooling model 144 is retained by using a method of assembly functionality. Assembly functionality, as used herein, means the ability of a CAD system to handle spatial relationships between parts. A system that offers such functionality, for example, is Unigraphics™ sold by Unigraphics Solutions.

To obtain a tooling analysis geometry 145 for performing manufacturing process analysis 321, surface and boundary extraction is performed on chunked tooling model 144 using the analysis code guidelines. Tooling analysis geometry 145 is tagged to accommodate typical manufacturing process analysis programs, which require unique identifiers ("tags") of topological entities (e.g., solid bodies, faces, edges, etc.), thereby generating tooling context model 141. Typically, the tags are names or name-value pairs, where the names and values will have some meaning for the manufacturing process analysis program, for example a region where the manufacturing process analysis code needs to apply a different mesh seed or a different temperature boundary condition.

More particularly, the orientation, defeaturing, chunking, surface and boundary extraction, and tagging are performed within LME 300.

According to a particular embodiment, the method further includes preparing tooling context model 141 for performance of the manufacturing process analysis, as follows. Tooling context model 141 is meshed using the analysis code guidelines to obtain a meshed tooling model 146. Exemplary analysis code guidelines provide a user with recommendations for mesh seeds based on the resolution of the model, in view of features such as holes, fillets, and other features that may cause problems with meshing. Exemplary analysis code guidelines also provide the user with suggested modifications to previous chunking and defeaturing based on previous analyses. More particularly, translation scripts of manufacturing process analysis programs, such as ANSYS, ABAQUS and STAR-CD™, perform the meshing, that is they tell the manufacturing process analysis program how to mesh the model, as well as how to apply boundary conditions and loads.

By way of background, a script is a collection of commands in an ASCII (or text) file, interpreted by an operating system (for example, HP-UX or Windows 2000) or by a particular program (Unigraphics, ANSYS, etc.) to automate a sequence of events that will be performed repeatedly. For example, an exemplary ANSYS script opens a meshed model from ICEM (name supplied by the user can be set for each run of the script), applies boundary conditions to particular tagged regions in the meshed model (supplied in an ASCII file generated by KBE rules), runs the analysis, and returns a predetermined set of results in a particular format to an output file.

As shown in FIG. 4, a number of boundary conditions, for example the contact conditions between pieces of the die for forging, are mapped onto meshed tooling model 146 using the analysis code guidelines, to obtain a tooling analysis model 147. For example, the translation scripts perform the mapping. Exemplary boundary conditions are obtained from operating conditions, for example pressures and temperatures. More particularly, operating conditions such as pressures and temperatures may need to be averaged, interpolated, or extrapolated to obtain the boundary conditions, depending on the number of node points and the fidelity of the operational data. Boundary conditions are stored, for example in a product data management (PDM) system 320, for example iMAN from Unigraphics and eMatrix, as indicated in FIG. 4. The boundary conditions are mapped, according to one embodiment, by linking tooling PDM system 320 through tooling LME 300, such as the LME methodology available through Unigraphics Wave. Moreover, the preparation may further include identification (for example, using the translation scripts) of standard shapes and loadings, for which closed form engineering solutions are known.

After tooling analysis model 147 is obtained, manufacturing process analysis 321 is performed thereon to obtain tooling analysis data 323, as indicated in FIG. 4. More particularly, a manufacturing process analysis code is executed using tooling analysis model 147 and a number of convergence criteria and process parameters. Convergence criteria determine if all of the user-specified constraints, the equation solvers are trending toward a solution. Exemplary process parameters include clamping forces, press speed, and temperature, and are stored for example in tooling PDM system 320. Exemplary manufacturing process analyses 321 are performed using finite element methodology and include simulation of the manufacturing process to generate data for stresses, deflections, temperatures, and strain rates for the part being manufactured and for the tooling, for example the die. The manufacturing process analysis code is stored, for example, on a simulation engine, which is a server that provides manufacturing process analysis through generalized interfaces defined by wrapping the manufacturing process analysis codes.

Tooling analysis data 323 is then used to evaluate tooling geometry 62 of tooling master model 134, according to a particular embodiment. More particularly, tooling analysis data 323 is evaluated, for example, by an automated computer program (e.g., iSIGHT™ by Engineous Software or ModelCenter™ by Phoenix Integration) or by an operator. If tooling analysis data 323 is deemed unsatisfactory, tooling geometry 62, and hence tooling master model 134, is modified using a set of manufacturing goals and taking into account tooling design tradeoffs, as indicated in FIG. 4. The manufacturing goals and tooling design tradeoffs vary based on implementation. Typical exemplary tooling goals for blade 10 include tooling service life and material used for tooling, and exemplary tooling design tradeoffs include cost, time to make tooling, and set-up time in production. In contrast, if the results of the evaluation are found to be satisfactory, tooling master model 134 is not altered, as indicated in FIG. 4.

More particularly, if tooling analysis data 323 is deemed unsatisfactory, the automated computer program or operator revises tooling geometry 62 by modifying the geometric parameters characterizing the constituent tooling features. This in turn updates tooling master model 134, which automatically updates tooling context model 141 because of the associative relationship between tooling master model 134 and tooling context model 141. Accordingly, the orientation through tagging, steps need not be repeated, as indicated in FIG. 4, provided any changes made to tooling geometry 62 are on a small parametric scale. However, for topological changes or for changes on a large parametric scale, such that applying the same chunking through tagging would create poor results, the scripts are desirably revisited to account for changes in the meshing strategy. The method encompasses both possibilities.

After updating tooling master model 134 (and by association, tooling context model 141), it is useful to repeat manufacturing process analysis 321, to determine whether performance is improved. Repetition of manufacturing process analysis 321 is indicated in FIG. 4. In one embodiment, tooling master model 134 is revised and manufacturing process analysis 321 is repeated until a satisfactory tooling geometry 62 (and corresponding preliminary tooling master model 134) is achieved. Alternatively, revision of tooling master model 134 and subsequent repetition of manufacturing process analysis 321 are performed a predetermined number of (one or more, for example five) times. For the latter embodiment, the optimal tooling geometry for part 10 is selected from the iterations, for example by the automated computer program or operator based on the manufacturing goals and tooling design tradeoffs. If no additional manufacturing process analyses are to be performed, tooling master model 134 corresponds to the optimal tooling geometry.

According to a more particular embodiment, at least one additional tooling context model (not shown) is generated and an additional manufacturing process analysis is performed to further evaluate the performance of tooling geometry 62. The additional tooling context model is generated and the additional manufacturing process analysis is performed in the manner described above with respect to tooling context model 141 and shown in FIG. 4. For this embodiment, tooling master model 134 is revised and the additional manufacturing process analysis is repeated, as discussed above with respect to manufacturing process analysis 321, to obtain a satisfactory tooling geometry 62 (and corresponding tooling master model 134). In the alternative embodiment, tooling master model 134 is revised, and the additional manufacturing process analysis is repeated a given number of times, and the optimal tooling geometry 62 is selected from the iterations.

Beneficially, because tooling master model 134 is a parametric model, it provides the tooling geometry for an entire part family. Thus, by changing the values of the parameters, tooling geometries for different members of the part family are automatically provided.

After generation of tooling master model 134, geometric dimensions and tolerances (GD&Ts or "geometric tolerances") are desirably added to tooling master model 134 in preparation for hard tooling (i.e., creation of the dies, molds, etc. for manufacturing part 10, as reverse or reengineered. In one embodiment, GD&Ts are added to tooling master model 134 using CAD system 42.

Figure 5:
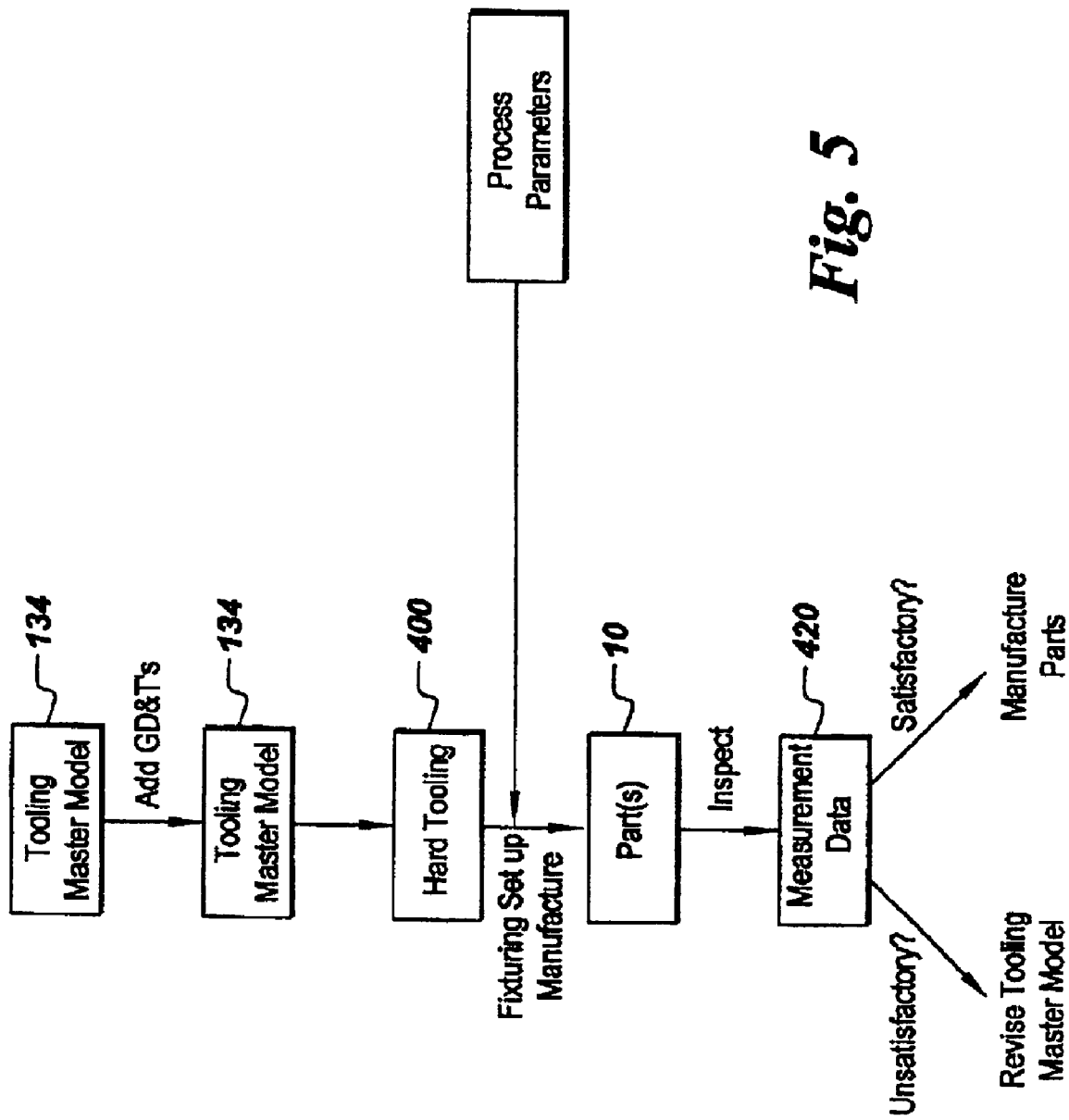
FIG. 5 shows a process block diagram for generation, testing and assessment of a hard tooling.

Tooling master model 134 is desirably used to manufacture parts. To this end a method of manufacturing is disclosed with general reference to FIGS. 1 and 5. The method of manufacturing includes generating manufacturing context model 136, creating tooling master model 134 from manufacturing context model 136, generating a hard tooling 400 using the tooling master model, and manufacturing at least one part 10 using the hard tooling and a number of process parameters. Prior to manufacturing part 10, fixturing and set up (or preprocessing work) is performed, as indicated in FIG. 5. Hard tooling 400 is generated using conventional hard tooling manufacturing techniques, which vary based on implementation. Process parameters are operating conditions that are set when manufacturing a part, for example machine parameters such as cutter speed, feed rates, press load, or general parameters such as temperature. Manufacturing context model 136 and tooling master model 134 are created as discussed above. According to a more particular embodiment, the method further includes adding GD&Ts to tooling master model 134.

In order to evaluate hard tooling 400, the method according to a particular embodiment further includes inspecting at least one part 10 manufactured using the hard tooling 400, as indicated in FIG. 5. Part 10 is inspected, for example using one or more of the following inspection techniques: digital radiography (such as computer tomography), optical scanning (such as non-contact optical three dimensional scanning performed using a non-contact 3D measurement system, for example a point, line, or area based scanner), infrared radiometry, and using a coordinate measuring machine (CMM). The measurement data 420 thus obtained are assessed to determine whether the part 10 manufactured satisfies a number of engineering criteria for the part. More particularly, the measurement data 420 are assessed by an engineer or an automated computer program, to determine whether tooling master model 134 produces acceptable parts 10 based on the engineering criteria for part 10. If parts 10 are acceptable, tooling master model 134 and hard tooling 400 continue to be used to manufacture parts 10. However, if parts 10 do not satisfy the engineering criteria, tooling master model 134 is revised and reevaluated one or more times, until the parts being manufactured 10 satisfy the engineering criteria.

A system 100 embodiment for generating tooling master model 134 for a manufacturing process for part 10, is described with general reference to FIGS. 1 and 3. System 100 includes CAD system 42, which is configured to receive parametric model 70 and to generate manufacturing context model 136 from the parametric model.

More particularly, CAD system 42 is further configured to orient the parametric model 70 after processing with a number of geometric dimensions and tolerances to obtain oriented GD&T model 133, as shown in FIG. 3. For this particular embodiment, system 100 further includes knowledge based environment 243, which is configured to apply a number of manufacturing design rules 242 to the oriented GD&T model to obtain the manufacturing context model 136 for the manufacturing step. As discussed above, knowledge based environment 243 can be either internal or external to CAD system 42.

For one embodiment, CAD system 42 is further configured to process parametric model 70 with producibility data from a producibility database 240, in order to add the GD&Ts. For example, system 100 further includes producibility database 240 and wrapper 241. Wrapper 241 is configured to link parametric model 70 to producibility database 240, as indicated in FIG. 3. For another embodiment, parametric model 70 includes GD&Ts prior to its reception by CAD system 42. The phrase "configured to" as used herein means that CAD system 42 and knowledge based environment 243 are equipped with a combination of hardware and software for performing the tasks of the invention, as will be understood by those skilled in the art. For example, CAD system 42 and knowledge based environment 243 include a computer equipped with software for performing their respective tasks. The present invention is not limited to any particular computer for performing the processing tasks of the invention. Rather, the term "computer" is intended to denote any machine capable of performing the calculations, or computations, necessary to perform the tasks of the invention, for example by accepting a structured input and processing the input in accordance with prescribed rules to produce an output.

Complex manufacturing processes may employ more than one manufacturing step and and may include one or more machining steps. Accordingly, tooling CAD system 42 is desirably configured to generate manufacturing context model 136 for a number of manufacturing steps. For this particular embodiment, CAD system 42 is further configured to orient manufacturing context model 136 to obtain oriented GD&T model 133, and knowledge based environment 243 is configured to apply the manufacturing design rules 242 to the oriented GD&T model 133 to generate the manufacturing context model 136, as shown in FIG. 3.

To generate tooling master model 134 from manufacturing context model 136, tooling knowledge based environment 243 is further configured to apply the tooling design rules to manufacturing context model 136. For this embodiment, tooling CAD system 42 is further configured to derive tooling geometry 62 from manufacturing context model 136 using the tooling design rules, as shown in FIG. 3. For manufacturing processes involving one or more machining steps, CAD system 42 is further configured to derive toolpaths from manufacturing context model 136 using tool path generation rules 242.

In order to evaluate tooling master model 134, system 100 further includes linked model environment 300, which is configured to create tooling context model 141, as illustrated in FIG. 4. The phrase "configured to" as used here means that LME 300 is equipped with a combination of hardware and software for performing the tasks of the invention. For this embodiment, system 100 further includes manufacturing process analysis code 321 for performing a manufacturing process analysis to generate tooling analysis data 323 for evaluating tooling master model 134. As shown in FIG. 4, manufacturing process analysis 321 is linked through tooling LME 300. More particularly, system 100 further includes part data management PDM system 320, which is configured to store operating condition data, for deriving a number of boundary conditions, and a number of process parameters. More particularly, PDM 20 is further configured to store all other product associated data and revision history. As indicated in FIG. 4, LME 300 is configured to link PDM system 320 to meshed tooling model 146, to map the boundary conditions onto meshed tooling model 146. LME 300 is further configured to link PDM system 320 to manufacturing process analysis 321, and to supply the process parameters for performing the manufacturing process analysis.

In order to produce hard tooling 400, tooling CAD system 42 is desirably further configured to add geometric dimensions and tolerances to tooling master model 134.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method of creating a tooling master model for a manufacturing process for a part, the tooling master model comprising a tooling geometry for the part and the manufacturing process comprising at least one manufacturing step, said method comprising:

generating a manufacturing context model from a parametric model for the part, the manufacturing context model comprising a plurality of tooling features, wherein the parametric model includes a plurality of geometric dimensions and tolerances (GD&T), and wherein said generation of the manufacturing context model comprises:

orienting the parametric model using the geometric dimensions and tolerances to obtain an oriented GD&T model, and applying a plurality of manufacturing design rules to the oriented GD&T model to obtain the manufacturing context model for the manufacturing step.

2. The method of claim 1, wherein the manufacturing process further comprises at least one additional manufacturing step, and wherein said generation of the manufacturing context model further comprises:

orienting the manufacturing context model to obtain the oriented GD&T model; and applying the manufacturing design rules to the oriented GD&T model to generate the manufacturing context model encompassing the additional manufacturing step, wherein said orientation and application are performed for each of the additional manufacturing steps.

3. The method of claim 1, wherein the manufacturing design rules include a plurality of tooling design rules, and wherein the method further comprises:

applying the tooling design rules to the manufacturing context model to obtain the tooling master model, wherein the tooling geometry is derived from the tooling features by said application of the tooling design rules.

4. The method of claim 3, further comprising creating at least one tooling context model comprising an associative copy of the tooling master model which is configured for performing a manufacturing process analysis.

5. The method of claim 4, wherein at least two tooling context models are created, each of the tooling context models being configured for performing a different manufacturing process analysis.

6. The method of claim 3, further comprising preparing the tooling context model for performance of the manufacturing process analysis, said preparation comprising:

meshing the tooling context model using the analysis code guidelines to obtain a meshed tooling model, and mapping a plurality of boundary conditions onto the meshed tooling model using the analysis code guidelines to obtain a tooling analysis model.

7. The method of claim 6, further comprising:

performing the manufacturing process analysis on the tooling analysis model to obtain tooling analysis data, said performance comprising executing a manufacturing process analysis code using the tooling analysis model, a plurality of convergence criteria, and a plurality of process parameters;

evaluating the tooling analysis data and, if the tooling analysis data are unsatisfactory, said method still further comprising:

modifying the tooling master model using a plurality of manufacturing goals tooling design tradeoffs; and repeating said performance of the manufacturing process analysis after modifying the tooling master model.

8. The method of claim 3, further comprising adding a plurality of geometric dimensions and tolerances (GD&Ts) to the tooling master model.

9. A system for generating a tooling master model for a manufacturing process for a part, the tooling master model comprising a tooling geometry and the manufacturing process comprising at least one manufacturing step, said system comprising:
  a computer aided design (CAD) system configured to receive a parametric model and to generate a manufacturing context model from the parametric model, the manufacturing context model comprising a plurality of tooling features, wherein said CAD system is further configured to orient the parametric model after processing with a plurality of geometric dimensions and tolerances to obtain an oriented GD&T model, and wherein said CAD system is further configured to process the parametric model with a plurality of producibility data to add the acometric dimensions and tolerances to the parametric model; and
  a knowledge based environment configured to apply a plurality of manufacturing design rules to the oriented GD&T model to obtain the manufacturing context model for the manufacturing step.

10. The system of claim 9, wherein the manufacturing process comprises at least one additional manufacturing step, wherein said CAD system is further configured to orient the manufacturing context model to obtain the oriented GD&T model,
  wherein said knowledge based environment is configured to apply the manufacturing design rules to the oriented GD&T model to generate the manufacturing context model encompassing the additional manufacturing step, and
  wherein said CAD system and said knowledge based environment are further configured to perform the orientation and application, respectively, for each of the additional manufacturing steps.

11. The system of claim 9, wherein the manufacturing design rules include a plurality of tooling design rules, wherein said knowledge based environment is further configured to apply the tooling design rules to the manufacturing context model, and wherein said CAD system is further configured to derive the tooling geometry from the manufacturing context model using the tooling design rules, to generate the tooling master model.

12. The system of claim 11, further comprising:
  a linked model environment configured for creating at least one tooling context model, wherein the tooling context model comprises an associative copy of the tooling master model and is configured for performing a manufacturing process analysis; and
  a manufacturing process analysis code for performing the manufacturing process analysis to generate tooling analysis data for evaluating the tooling master model.

13. The system of claim 12, further comprising a part data management (PDM) system configured to store operating condition data for deriving a plurality of boundary conditions and a plurality of process parameters, wherein said linked model environment is configured to link said PDM system:
  to a meshed tooling model obtained from the tooling context model, to map the boundary conditions onto the meshed tooling model, and
  to the manufacturing process analysis to supply the process parameters for performing the manufacturing process analysis.

14. The system of claim 11, wherein said CAD system is further configured to add a plurality of geometric dimensions and tolerances (GD&Ts) to the tooling master model.

15. A method of manufacturing comprising:
  generating a manufacturing context model for a manufacturing process for a part from a parametric model, the manufacturing context model comprising a plurality of tooling features and the manufacturing process comprising at least one manufacturing step;
  creating a tooling master model from the manufacturing context model, the tooling master model comprising a tooling geometry for the part;
  generating a hard tooling using the tooling master model; and
  manufacturing at least one part using the hard tooling and a plurality of process parameters, wherein said generation of the manufacturing context model comprises:
    orienting the parametric model with a plurality acometric dimensions and tolerances to obtain an oriented GD&T model, and
    applying a plurality of manufacturing design rules to the oriented GD&T model to obtain the manufacturing context model for the manufacturing step, wherein the manufacturing design rules comprise a plurality of tooling design rules.

16. The method of claim 15, wherein the manufacturing process further comprises at least one additional manufacturing step, and wherein said generation of the manufacturing context model further comprises:
  orienting the manufacturing context model to obtain the oriented GD&T model; and
  applying the manufacturing design rules to the oriented GD&T model to generate the manufacturing context model encompassing the additional manufacturing step, wherein said orientation and application are performed for each of the additional manufacturing steps.

17. The method of claim 15, wherein said creation of the tooling master model comprises applying the tooling design rules to the manufacturing context model to obtain the tooling master model, wherein the tooling geometry is derived from the tooling features by said application of the tooling design rules.

18. The method of claim 17, further comprising:
  creating at least one tooling context model comprising an associative copy of the tooling master model which is configured for performing a manufacturing process analysis;
  preparing the tooling context model for performance of the manufacturing process analysis;
  performing the manufacturing process analysis to obtain tooling analysis data;
  evaluating the tooling analysis data and, if the tooling analysis data are unsatisfactory, said method still further comprising:
  modifying the tooling master model using a plurality of manufacturing goals tooling design tradeoffs; and
  repeating said performance of the manufacturing process analysis after modifying the tooling master model.

19. The method of claim 17, further comprising adding a plurality of geometric dimensions and tolerances (GD&Ts) to the tooling master model.

20. The method of claim 19, further comprising:
  inspecting at least one part manufactured using the hard tooling to obtain measurement data; and
  assessing the measurement data to determine whether the part manufactured satisfies a plurality of engineering criteria for the part.

* * * * *

UNITED STATES PATENT AND TRADEMARK OFFICE
CERTIFICATE OF CORRECTION

PATENT NO. : 6,856,842 B2  Page 1 of 1
DATED : February 15, 2005
INVENTOR(S) : Rebello et al.

It is certified that error appears in the above-identified patent and that said Letters Patent is hereby corrected as shown below:

Column 13,
Line 16, reads "ducibility data to add the acometric dimensions and" should read
-- ducibility data to add the geometric dimensions and --

Column 14,
Line 15, reads "orienting the parametric model with a plurality aco-" should read
-- orienting the parametric model with a plurality geo- --

Signed and Sealed this

Seventh Day of June, 2005

JON W. DUDAS
*Director of the United States Patent and Trademark Office*